United States Patent
Chen

(10) Patent No.: US 11,151,403 B2
(45) Date of Patent: Oct. 19, 2021

(54) METHOD AND APPARATUS FOR SEGMENTING SKY AREA, AND CONVOLUTIONAL NEURAL NETWORK

(71) Applicant: BOE TECHNOLOGY GROUP CO., LTD., Beijing (CN)

(72) Inventor: Guannan Chen, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 109 days.

(21) Appl. No.: 16/436,030

(22) Filed: Jun. 10, 2019

(65) Prior Publication Data

US 2020/0034648 A1  Jan. 30, 2020

(30) Foreign Application Priority Data

Jul. 27, 2018 (CN) .......................... 201810844647.0

(51) Int. Cl.
*G06K 9/00* (2006.01)
*G06K 9/34* (2006.01)
*G06K 9/66* (2006.01)
*G06N 3/04* (2006.01)

(52) U.S. Cl.
CPC .......... *G06K 9/34* (2013.01); *G06K 9/00697* (2013.01); *G06K 9/66* (2013.01); *G06N 3/0454* (2013.01)

(58) Field of Classification Search
CPC ........ G06N 3/02–049; G06K 9/00624–00845; G06K 9/34; G06K 9/66; G06T 7/10–194
See application file for complete search history.

(56) References Cited

U.S. PATENT DOCUMENTS

2017/0148222 A1  5/2017  Holzer et al.
2020/0250487 A1*  8/2020  Song .................... G06K 9/6262

FOREIGN PATENT DOCUMENTS

| CN | 104794688 A | 7/2015 |
| CN | 105869174 A | 8/2016 |
| CN | 106934765 A | 7/2017 |
| CN | 107564007 A | 1/2018 |
| CN | 107590811 A | 1/2018 |

(Continued)

OTHER PUBLICATIONS

Mihail et al Sky Segmentation in the Wild : An Empirical Study 2016 IEEE Winter Conference on Applications of Computer Vision (Year: 2016).*

(Continued)

*Primary Examiner* — Sean T Motsinger
(74) *Attorney, Agent, or Firm* — Westman, Champlin & Koehler, P.A.

(57) ABSTRACT

The present disclosure provides a method and apparatus for segmenting a sky area, and a convolutional neural network. The method includes: acquiring, by the image input layer, an original image; extracting, by the first convolutional neural network, a plurality of sky feature images with different scales from the original image; processing, by the plurality of cascaded second convolutional neural networks, the plurality of sky feature images to output a target feature image; up-sampling, by the up-sampling layer, the target feature image to obtain an up-sampled feature image; determining, by the sky area determining layer, a pixel area of which a gray value is greater than or equal to a preset gray value in the up-sampled feature image as a sky area.

16 Claims, 7 Drawing Sheets

(56) References Cited

FOREIGN PATENT DOCUMENTS

| CN | 107808386 A | 3/2018 |
|---|---|---|
| CN | 107993238 A | 5/2018 |

OTHER PUBLICATIONS

Lin et al "RefineNet: Multi path refinement networks for High Resolution Symantic Segmentation" (Year: 2016).*
Simonyan et al "Very Deep Convolutional Networks for large scale image recognition" ICLR 2015 (Year: 2015).*
Vasanth Philomin "threholding" users.umiacs.umd.edu/~vasi/JavaWorkshop/node3.htm Jun. 11, 1998 (Year: 1998).*
First Office Action, including Search Report, for Chinese Patent Application No. 201810844647.0, dated May 6, 2020, 23 pages.
Long, Jonathan et al., "Fully Convolutional Networks for Semantic Segmentation", Article, arXiv:1411.4038v2 [cs.CV], dated Mar. 8, 2015, 10 pages.
Sun, Weiwei et al., "Fully Convolutional Networks for Semantic Segmentation of Very High Resolution Remotely Sensed Images Combined With DSM", Article, DOI: 10.1109/LGRS.2018.2795531, dated Mar. 31, 2018, 5 pages.
Tang, Zhimin et al., "A joint residual network with paired ReLUs activation for image super-resolution", Journal Article, http://dx.doi.org/10.1016/j.neucom.2017.07.0610925-2312, dated Aug. 31, 2017, 10 pages.
Jiang Feng et al, "Survey on Content-Based Image Segmentation Methods", Journal of Software, doi: 10.13328/j.cnki.jos.005136, dated Nov. 4, 2016, 73 pages.
Shen, Yehu et al., "Sky Region Detection in a Single Image for Autonomous Ground Robot Navigation", Regular Paper, INTECH, open science/open minds, Open Access Article, International Journal of Advanced Robotic Systems, Accepted Jul. 30, 2013, DOI: 10.5772/56884, © 2013 Shen and Wang, Int. j. adv. robot. syst., 2013, vol. 10, 362:2013; China, 13 pages.
La Place, Cecilia et al., "Segmenting Sky Pixels in Images", arXiv:1712.09161v2 [cs.CV] Jan. 8, 2018, Arizona State University and University of Central Florida, 11 pages.
Li, J Y et al., Image haze removal based on sky region detection and dark channel prior [J], Journal of Image and Graphics, 2015, 20 (4) : 0514-0519, DOI: 10.11834/jig.20150407, China, 6 pages.
Second Office Action, including Search Report, for Chinese Patent Application No. 201810844647.0, dated Feb. 8, 2021, 14 pages.
Lin, G. et al., "RefineNet: Multi-Path Refinement Networks for High-Resolution Semantic Segmentation", arXiv:1611.06612v3 [cs.CV], Nov. 25, 2016, 11 pages.

* cited by examiner

METHOD AND APPARATUS FOR SEGMENTING SKY AREA, AND CONVOLUTIONAL NEURAL NETWORK

CROSS-REFERENCE TO RELATED APPLICATION

This application claims the benefit of Chinese Patent Application No. 201810844647.0, filed on Jul. 27, 2018, the disclosure of which is incorporated herein in its entirety by reference.

TECHNICAL FIELD

The present disclosure relates to the field of image processing technologies, and in particular, to a method and apparatus for segmenting a sky area, and a convolutional neural network.

BACKGROUND

Image segmentation technology is a very important research direction in the field of image processing. A method for segmenting a sky area is a specific application scenario in image segmentation. The purpose of the method is to accurately identify the sky area and distinguish the sky area from another target. At present, the method for segmenting the sky is applied in drone vision, weather monitoring, and entertainment software.

SUMMARY

Embodiments of the present disclosure provide a method for segmenting a sky area based on a convolutional neural network, wherein the convolutional neural network includes an image input layer, a first convolutional neural network, a plurality of cascaded second convolutional neural networks, an up-sampling layer, and a sky area determining layer, the method includes:

acquiring, by the image input layer, an original image;

extracting, by the first convolutional neural network, a plurality of sky feature images with different scales from the original image, wherein a scale of each sky feature image is smaller than a scale of the original image;

processing, by the plurality of cascaded second convolutional neural networks, the plurality of sky feature images to output a target feature image, wherein a scale of the target feature image is the same as a maximum scale in the plurality of sky feature images;

up-sampling, by the up-sampling layer, the target feature image to obtain an up-sampled feature image of which a scale is the same as the scale of the original image;

determining, by the sky area determining layer, a pixel area of which a gray value is greater than or equal to a preset gray value in the up-sampled feature image as a sky area.

Optionally, the plurality of sky feature images include a first sky feature image, a second sky feature image, a third sky feature image, and a fourth sky feature image; a scale of the first sky feature image is ½ of a scale of the second sky feature image, the scale of the second sky feature image is ½ of a scale of the third sky feature image, the scale of the third sky feature image is ½ of a scale of the fourth sky feature image, the plurality of cascaded second convolutional neural networks includes three levels of the second convolutional neural networks;

wherein the processing, by the plurality of cascaded second convolutional neural networks, the plurality of sky feature images to output a target feature image includes:

performing, by a first-level second convolutional neural network, feature processing on the first sky feature image and the second sky feature image to obtain a first intermediate target feature image of which a scale is the same as the scale of the second sky feature image;

performing, by a second-level second convolutional neural network, the feature processing on the first intermediate target feature image and the third sky feature image to obtain a second intermediate target feature image of which a scale is the same as the scale of the third sky feature image;

performing, by a third-level second convolutional neural network, the feature processing on the second intermediate target feature image and the fourth sky feature image to obtain the target feature image of which the scale is the same as the scale of the fourth sky feature image.

Optionally, the first convolutional neural network is a VGG-19 convolutional neural network; the fourth sky feature image is an output image of a fourth convolution layer in the first convolutional neural network, the third sky feature image is an output image of an eighth convolution layer in the first convolutional neural network, the second sky feature image is an output image of a twelfth convolution layer in the first convolutional neural network, and the first sky feature image is an output image of a sixteenth convolution layer in the first convolutional neural network.

Optionally, the scale of the fourth sky feature image is ½ of the scale of the original image, the scale of the third sky feature image is ¼ of the scale of the original image, the scale of the second sky feature image is ⅛ of the scale of the original image, the scale of the first sky feature image is 1/16 of the scale of the original image.

Optionally, the second convolutional neural network at each level includes:

a residual convolution unit, to perform global feature extraction on the input feature image;

a multi-scale fusion unit, to perform feature fusion on a feature image output by the residual convolution unit;

a chain residual pooling unit, to perform low-frequency feature extraction on a feature image output by the multi-scale fusion unit; and a convolution output unit, to convolve a feature image output by the chain residual pooling unit to obtain an intermediate target feature image or the target feature image.

Optionally, the residual convolution unit includes:

a first activation function subunit, to perform nonlinear processing on the input feature image;

a first convolution subunit, to convolve a feature image output by the first activation function subunit;

a first batch normalization (BN) subunit, to perform regularization processing on a feature image output by the first convolution subunit;

a second activation function subunit, to perform nonlinear processing on a feature image output by the first BM subunit;

a second convolution subunit, to convolve a feature image output by the second activation function subunit;

a second BN subunit, to perform regularization processing on a feature image output by the second convolution subunit; and a first superposition subunit, to perform feature superposition on the feature image input into the first activation function subunit and a feature image output by the second BN subunit.

Optionally, the multi-scale fusion unit includes:

a third convolution subunit, to convolve a feature image with a larger scale in feature images output by the residual convolution unit;

a fourth convolution subunit, to convolve a feature image with a smaller scale in the feature images output by the residual convolution unit;

an up-sampling subunit, to up-sample a feature image output by the fourth convolution subunit; and a second superposition subunit, to perform feature superimposition on a feature image output by the third convolution subunit and a feature image output by the up-sampling subunit.

Optionally, the chain residual pooling unit includes:

a first pooling subunit, to perform pooling processing on a feature image output by the multi-scale fusion unit;

a fifth convolution subunit, to convolve a feature image output by the first pooling subunit;

a third BN subunit, to perform regularization processing on a feature image output by the fifth convolution subunit;

a third superposition subunit, to perform feature superposition on a feature image output by the multi-scale fusion unit and a feature image output by the third BN subunit;

a second pooling subunit, to perform pooling processing on a feature image output by the third BN subunit;

a sixth convolution subunit, to convolve a feature image output by the second pooling subunit;

a fourth BN subunit, to perform regularization processing on a feature image output by the sixth convolution subunit; and a fourth superposition subunit, to perform feature superimposition on a feature image output by the third superposition subunit and a feature image output by the fourth BN subunit.

Optionally, before the acquiring, by the image input layer, an original image, the method further includes:

training the convolutional neural network by a random gradient descent method using a training image of a sky scene.

Optionally, a loss function Loss of the random gradient descent method is:

$$\text{Loss} = \frac{1}{H \times W} \sum_{i \in H, j \in W} (I'_{ij} - I_{ij})^2$$

wherein H is the total number of rows of pixels of the training image, W is the total number of columns of the pixels of the training image, i is a row number of a pixel of the training image, j is a column number of the pixel of the training image, $I_{ij}$ is a real result that a target pixel of which a row number is i and a column number is j belongs to the sky area, $I'_{ij}$ is an output result that the target pixel belongs to the sky area outputted by the iterative convolutional neural network.

In order to solve the above problem, embodiments of the present disclosure provide a convolutional neural network processor for segmenting a sky area, including:

an image input layer, to acquire an original image;

a first convolutional neural network, to extract a plurality of sky feature images with different scales from the original image, wherein a scale of each sky feature image is smaller than a scale of the original image;

a plurality of cascaded second convolutional neural networks, to process the plurality of sky feature images to output a target feature image, wherein a scale of the target feature image is the same as a maximum scale in the plurality of sky feature images;

an up-sampling layer, to up-sample the target feature image to obtain an up-sampled feature image of which a scale is the same as the scale of the original image; and a sky area determining layer, to determine a pixel area of which a gray value is greater than or equal to a preset gray value in the up-sampled feature image as a sky area.

Optionally, the plurality of sky feature images include a first sky feature image, a second sky feature image, a third sky feature image, and a fourth sky feature image; a scale of the first sky feature image is ½ of a scale of the second sky feature image, the scale of the second sky feature image is ½ of a scale of the third sky feature image, the scale of the third sky feature image is ½ of a scale of the fourth sky feature image, the plurality of cascaded second convolutional neural networks includes three levels of the second convolutional neural networks;

a first-level second convolutional neural network is to perform feature processing on the first sky feature image and the second sky feature image to obtain a first intermediate target feature image of which a scale is the same as the scale of the second sky feature image;

a second-level second convolutional neural network is to perform the feature processing on the first intermediate target feature image and the third sky feature image to obtain a second intermediate target feature image of which a scale is the same as the scale of the third sky feature image;

a third-level second convolutional neural network is to perform the feature processing on the second intermediate target feature image and the fourth sky feature image to obtain the target feature image of which the scale is the same as the scale of the fourth sky feature image.

Optionally, the first convolutional neural network is a VGG-19 convolutional neural network; the fourth sky feature image is an output image of a fourth convolution layer in the first convolutional neural network, the third sky feature image is an output image of an eighth convolution layer in the first convolutional neural network, the second sky feature image is an output image of a twelfth convolution layer in the first convolutional neural network, and the first sky feature image is an output image of a sixteenth convolution layer in the first convolutional neural network.

Optionally, the scale of the fourth sky feature image is ½ of the scale of the original image, the scale of the third sky feature image is ¼ of the scale of the original image, the scale of the second sky feature image is ⅛ of the scale of the original image, the scale of the first sky feature image is 1/16 of the scale of the original image.

Optionally, the second convolutional neural network at each level includes:

a residual convolution unit, to perform global feature extraction on the input feature image;

a multi-scale fusion unit, to perform feature fusion on a feature image output by the residual convolution unit;

a chain residual pooling unit, to perform low-frequency feature extraction on a feature image output by the multi-scale fusion unit; and a convolution output unit, to convolve a feature image output by the chain residual pooling unit to obtain an intermediate target feature image or the target feature image.

Optionally, the residual convolution unit includes:

a first activation function subunit, to perform nonlinear processing on the input feature image;

a first convolution subunit, to convolve a feature image output by the first activation function subunit;

a first batch normalization (BN) subunit, to perform regularization processing on a feature image output by the first convolution subunit;

a second activation function subunit, to perform nonlinear processing on a feature image output by the first BM subunit;

a second convolution subunit, to convolve a feature image output by the second activation function subunit;

a second BN subunit, to perform regularization processing on a feature image output by the second convolution subunit; and a first superposition subunit, to perform feature superposition on the feature image input into the first activation function subunit and a feature image output by the second BN subunit.

Optionally, the multi-scale fusion unit includes:

a third convolution subunit, to convolve a feature image with a larger scale in feature images output by the residual convolution unit;

a fourth convolution subunit, to convolve a feature image with a smaller scale in the feature images output by the residual convolution unit;

an up-sampling subunit, to up-sample a feature image output by the fourth convolution subunit; and a second superposition subunit, to perform feature superimposition on a feature image output by the third convolution subunit and a feature image output by the up-sampling subunit.

Optionally, the chain residual pooling unit includes:

a first pooling subunit, to perform pooling processing on a feature image output by the multi-scale fusion unit;

a fifth convolution subunit, to convolve a feature image output by the first pooling subunit;

a third BN subunit, to perform regularization processing on a feature image output by the fifth convolution subunit;

a third superposition subunit, to perform feature superposition on a feature image output by the multi-scale fusion unit and a feature image output by the third BN subunit;

a second pooling subunit, to perform pooling processing on a feature image output by the third BN subunit;

a sixth convolution subunit, to convolve a feature image output by the second pooling subunit;

a fourth BN subunit, to perform regularization processing on a feature image output by the sixth convolution subunit; and a fourth superposition subunit, to perform feature superimposition on a feature image output by the third superposition subunit and a feature image output by the fourth BN subunit.

Optionally, the convolutional neural network further includes:

a network training layer, to train the convolutional neural network by a random gradient descent method using a training image of a sky scene.

Optionally, a loss function Loss of the random gradient descent method is:

$$Loss = \frac{1}{H \times W} \sum_{i \in H, j \in W} (I'_{ij} - I_{ij})^2$$

wherein H is the total number of rows of pixels of the training image, W is the total number of columns of the pixels of the training image, i is a row number of a pixel of the training image, j is a column number of the pixel of the training image, $I_{ij}$ is a real result that a target pixel of which a row number is i and a column number is j belongs to the sky area, $I'_{ij}$ is an output result that the target pixel belongs to the sky area outputted by the iterative convolutional neural network.

Embodiments of the present disclosure provide an apparatus for segmenting a sky area based on a convolutional neural network, including a processor and a storage, wherein the processor is connected to the storage via a bus, the storage stores execution instructions of the above method for segmenting a sky area based on a convolutional neural network, the processor executes the execution instructions; wherein the convolutional neural network includes an image input layer, a first convolutional neural network, a plurality of cascaded second convolutional neural networks, an up-sampling layer, and a sky area determining layer, the processor includes:

an acquiring module, to control the image input layer to acquire an original image;

an extracting module, to control the first convolutional neural network to extract a plurality of sky feature images with different scales from the original image, wherein a scale of each sky feature image is smaller than a scale of the original image;

a processing module, to control the plurality of cascaded second convolutional neural networks to process the plurality of sky feature images to output a target feature image, wherein a scale of the target feature image is the same as a maximum scale in the plurality of sky feature images;

an up-sampling module, to control the up-sampling layer to up-sample the target feature image to obtain an up-sampled feature image of which a scale is the same as the scale of the original image; and a determining module, to control the sky area determining layer to determine a pixel area of which a gray value is greater than or equal to a preset gray value in the up-sampled feature image as a sky area.

Optionally, the plurality of sky feature images include a first sky feature image, a second sky feature image, a third sky feature image, and a fourth sky feature image; a scale of the first sky feature image is ½ of a scale of the second sky feature image, the scale of the second sky feature image is ½ of a scale of the third sky feature image, the scale of the third sky feature image is ½ of a scale of the fourth sky feature image, the plurality of cascaded second convolutional neural networks include three levels of the second convolutional neural networks;

the processing module includes:

a first feature processing sub-module, to control a first-level second convolutional neural network to perform feature processing on the first sky feature image and the second sky feature image to obtain a first intermediate target feature image of which a scale is the same as the scale of the second sky feature image;

a second feature processing sub-module, to control a second-level second convolutional neural network to perform the feature processing on the first intermediate target feature image and the third sky feature image to obtain a second intermediate target feature image of which a scale is the same as the scale of the third sky feature image;

a third feature processing sub-module, to control a third-level second convolutional neural network to perform the feature processing on the second intermediate target feature image and the fourth sky feature image to obtain the target feature image of which the scale is the same as the scale of the fourth sky feature image.

Optionally, the second convolutional neural network at each level includes:

a residual convolution unit, to perform global feature extraction on the input feature image;

a multi-scale fusion unit, to perform feature fusion on a feature image output by the residual convolution unit;

a chain residual pooling unit, to perform low-frequency feature extraction on a feature image output by the multi-scale fusion unit; and a convolution output unit, to convolve a feature image output by the chain residual pooling unit to obtain an intermediate target feature image or the target feature image.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

A current method for segmenting a sky area mainly segments the sky area based on the gradient statistical technique. For example, a method for segmenting the sky area in which a gradient threshold is combined with a brightness threshold may segment the sky area in a daytime scene. For another example, a method for segmenting the sky area in which gradient statistics is combined with an energy function optimization may segment the sky area in a cloud scene. The above methods for segmenting the sky area have a low accuracy in segmenting the sky area in a scene where the sky boundary is not clear, such as dense fog and dark night. Therefore, the above methods for segmenting the sky area are not suitable for segmenting the sky area in the scenes of dense fog and dark night. In order to solve the above technical problem, embodiments of the present disclosure provide a method for segmenting the sky area, an apparatus, and a convolutional neural network.

Figure 1:
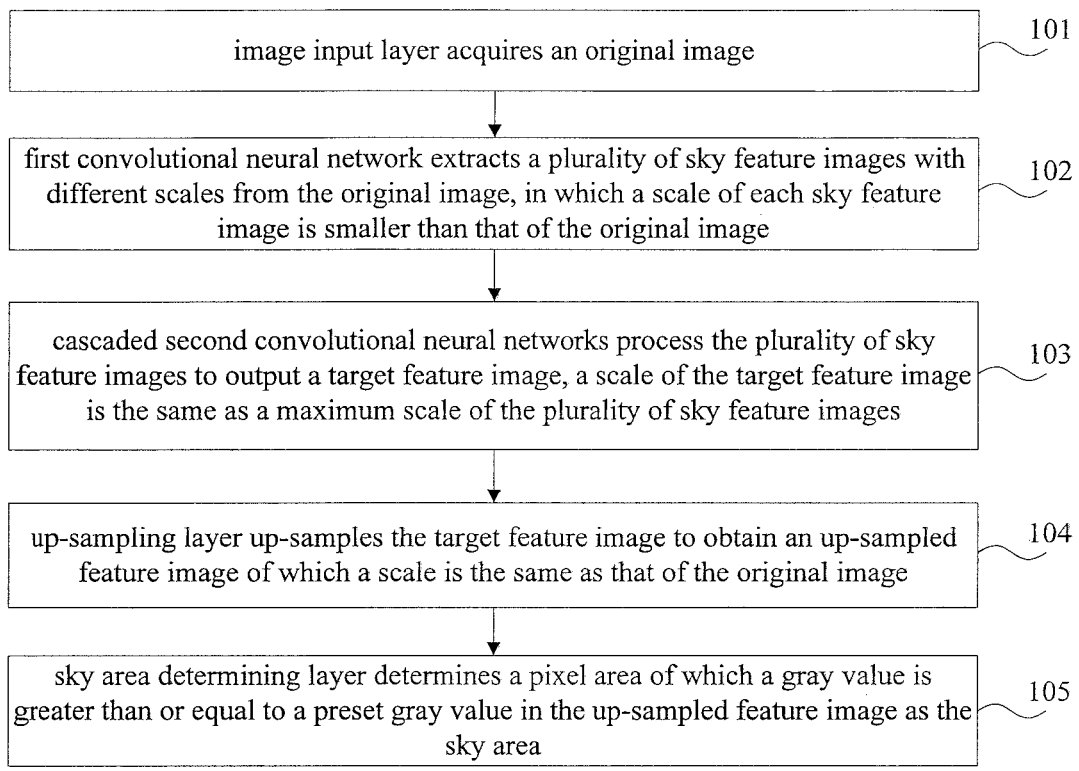
FIG. 1 is a flowchart illustrating a method for segmenting a sky area according to an embodiment of the present disclosure.

FIG. 1 is a flowchart illustrating a method for segmenting a sky area based on a convolutional neural network according to an embodiment of the present disclosure. The convolutional neural network includes an image input layer, a first convolutional neural network, a plurality of cascaded second convolutional neural networks, an up-sampling layer, and a sky area determining layer. The method for segmenting the sky area according to the embodiment of the present disclosure may include following operations.

Step 101: the image input layer acquires an original image.

In an embodiment of the present disclosure, the original image in which the sky area is to be segmented may be input into the image input layer in the convolutional neural network, so that the image input layer acquires the original image.

Step 102: the first convolutional neural network extracts a plurality of sky feature images with different scales from the original image, in which a scale of each sky feature image is smaller than that of the original image.

In an embodiment of the present disclosure, a plurality of sky feature images with different scales may be extracted from the original image through the first convolutional neural network in the convolutional neural network. Specifically, the first convolutional neural network may include multiple convolution layers capable of extracting different sky features in the scenes of dense fog and dark night, and multiple pooling layers. One or more convolution layers may be followed by a pooling layer. An image may be input into the convolution layer for extracting sky features in the scenes of dense fog and dark night, and then a sky feature image is output. An image may be input into the pooling layer for down-sampling, thereby extracting a low frequency feature of the image, and reducing the scale of the sky feature image. In other words, the scale of the output image of the pooling layer is smaller than the scale of the input image. For example, the scale of the output image of the ½ pooling layer is ½ of the scale of the input image. Since the number of pooling layers through which each sky feature image passes before being output is different, the scales of the sky feature images are different.

In an embodiment of the present disclosure, the original image may be input into the first convolutional neural network, and a sky feature image output by a specific convolutional layer may be obtained. In other words, a plurality of sky feature images with different scales may be obtained. Since each sky feature image is down-sampled by the ½ pooling layer before being output, the scale of each sky feature image is smaller than the scale of the original image.

Step 103: the plurality of cascaded second convolutional neural networks process the plurality of sky feature images to output a target feature image, a scale of the target feature image is the same as a maximum scale of the plurality of sky feature images.

In the embodiment of the present disclosure, two sky feature images with different scales may be input into each second convolutional neural network, so that feature processing may separately be performed on the input two sky feature images. The smaller one in the two feature images being processed with the feature processing is up-sampled to increase the scale of the feature image, thereby obtaining two feature images with the same scale. Pixel values of pixels in the same position among the two feature images with the same scale are added to perform feature fusion, and the feature image after the feature fusion is obtained. Then, chain residual pooling is performed on the feature image after the feature fusion to extract a low frequency feature in the feature image. Then the pooled feature image is convoluted to output an intermediate target feature image. The intermediate target feature image output by each second convolutional neural network may be used as one of input feature images of the next second convolutional neural network.

The plurality of sky feature images may include a first sky feature image, a second sky feature image, a third sky feature image, and a fourth sky feature image whose scales are sequentially increased. Correspondingly, the plurality of second convolutional neural networks may specifically include three levels of the second convolutional neural networks. For a first-level second convolutional neural network, an input feature image is two sky feature images with the smallest scale in the plurality of sky feature images, i.e., a first sky feature image and a second sky feature image. For a second-level second convolutional neural network, an input feature image is an intermediate target feature image output by the first-level second convolutional neural network, and a sky feature image with the smallest scale in the sky feature images which are not input at this time, i.e., a third sky feature image. For a third-level second convolutional neural network, an input feature image is an intermediate target feature image output by the second-level second convolutional neural network, and a sky feature image which is not input at this time, i.e., a fourth sky feature image.

In the embodiment of the present disclosure, a plurality of sky feature images whose scales are different and are smaller than the original image may be extracted from the original image. The plurality of sky feature images are processed by the plurality of cascaded second convolutional neural networks, so that a small-scale feature channel is up-sampled and superimposed with a large-scale feature channel to form a new large-scale feature channel, which may extract sky semantic features in dense fog and dark night scenes at multiple levels, so that the output target feature image may include sky features with various scales to facilitate accurate determination of the sky boundary in the scenes of dense fog and dark night. In this way, the sky area in the scenes of dense fog and dark night is accurately segmented.

Step 104: the up-sampling layer up-samples the target feature image to obtain an up-sampled feature image of which a scale is the same as that of the original image.

In the embodiment of the present disclosure, since the scale of the target feature image is the same as the scale of the sky feature image with the largest scale, but the scale of the target feature image is still smaller than the scale of the original image, a processing device may up-sample the target feature image to obtain the up-sampled feature image of which the scale is the same as that of the original image. Since the up-sampled feature image is obtained based on low frequency features with different scales, the up-sampled feature image may include a low frequency feature of the sky area.

Step 105: the sky area determining layer determines a pixel area of which a gray value is greater than or equal to a preset gray value in the up-sampled feature image as the sky area.

In the embodiment of the present disclosure, after obtaining the up-sampled feature image, the processing device may determine the pixel area of which the gray value is greater than or equal to the preset gray value in the up-sampled feature image as the sky area, so that the sky area in the original image may be segmented.

In the embodiment of the present disclosure, the original image may be first acquired. Multiple sky feature images with different scales are extracted from the original image through the first convolutional neural network. The multiple sky feature images are processed through the multiple cascaded second convolutional neural networks to output a target feature image. The target feature image is up-sampled to obtain the up-sampled feature image of which the scale is the same as the scale of the original image. The pixel area of which the gray value is greater than or equal to the preset gray value in the up-sampled feature image is determined as the sky area. In the embodiment of the present disclosure, multiple sky feature images with different scales may be extracted. The multiple sky feature images are processed through a plurality of cascaded second convolutional neural networks. The sky semantic features in the original image may be extracted, at multiple levels, from images with different scales. Thus, the output target feature image may include sky features with various scales, which is conducive to accurately determine the sky boundary in dense fog and dark night scenes. As such, the sky area in the scenes of dense fog and dark night may be segmented accurately.

Figure 2:
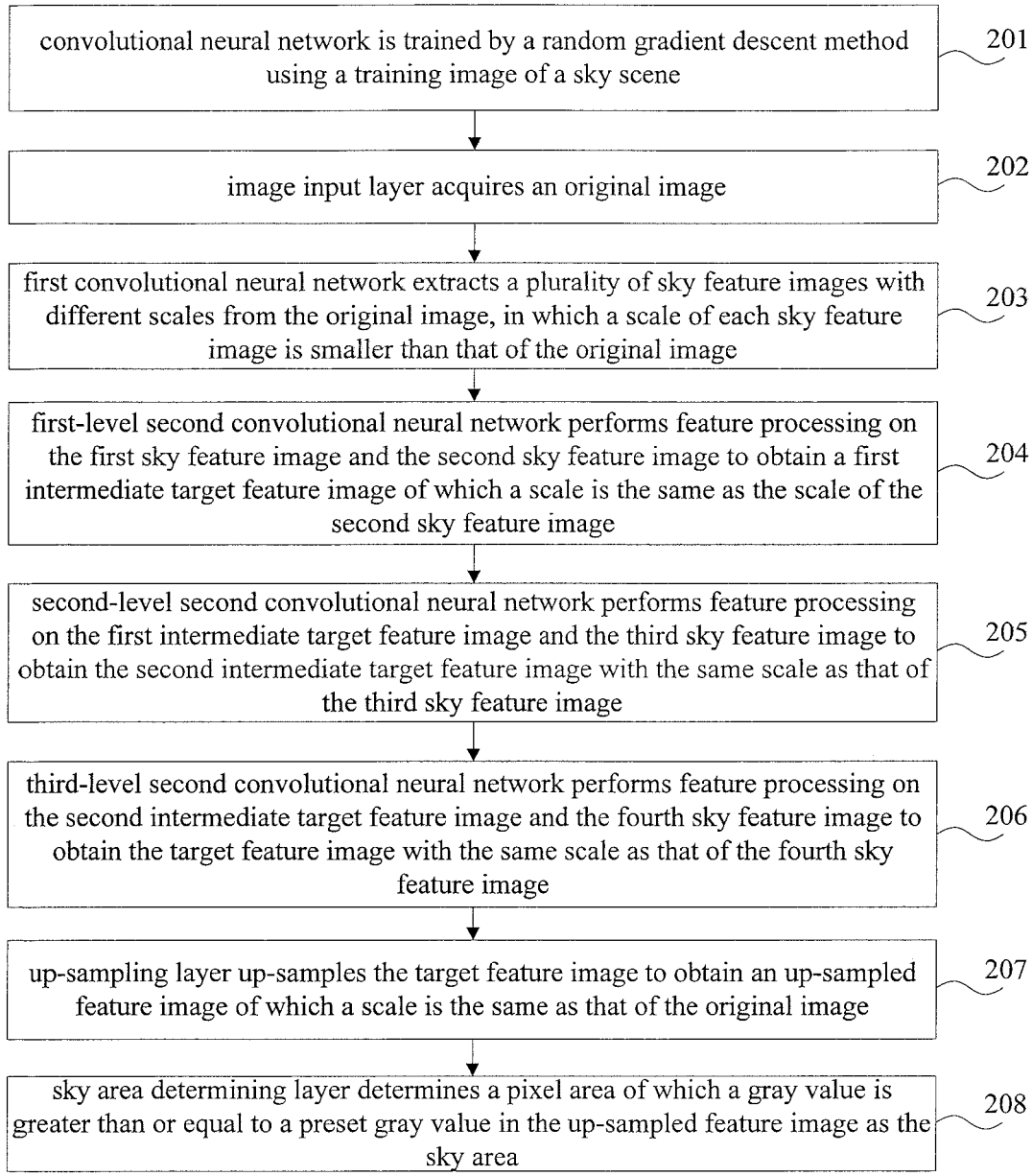
FIG. 2 is a flowchart illustrating a method for segmenting a sky area according to an embodiment of the present disclosure.

FIG. 2 is a flowchart illustrating a method for segmenting a sky area according to an embodiment of the present disclosure. The method for segmenting the sky area according to the embodiment of the present disclosure may include following operations.

Step 201: a convolutional neural network is trained by a random gradient descent method using a training image of a sky scene.

In the embodiment of the present disclosure, a to-be-trained convolutional neural network and a training image of each sky scene may be acquired. A preset number of target training images may be randomly selected from the training image of each sky scene each time. The target training images extracted each time are sequentially input into the convolutional neural network for gradient descent iterative training until the number of iterations reaches a preset number of times. Then the training is completed and the trained convolutional neural network is obtained.

The training image of each sky scene may include a training image in a scene with a good ambient light at night, a training image in a scene with a poor ambient light at night, a training image in a daytime foggy scene, a training image in a scene with daylight mist and daylight interference, and the like. Of course, a training image in a sunny scene, a training image in a cloud scene on a sunny day, and the like, may also be included, which are not limited in the embodiment of the present disclosure. The skyFinder data set in related art includes images of various sky scenes, each of which includes a sky area. As such, the skyFinder data set may be used to train a convolutional neural network. The skyFinder data set may be downloaded from a dedicated database on the Internet, and stored in the execution device of the method. When the convolutional neural network is trained, the device may call the skyFinder data set to train the convolutional neural network. The skyFinder dataset has 46 sky scenes and more than 80,000 frames. The ratio of a training set to a test set in the skyFinder data set is 9:1. In other words, 90% of the images in the skyFinder data set may be used for network training, and 10% of the images may be used for testing the trained network.

In an embodiment of the present disclosure, the sky area in each training image may be calibrated to provide a true segmentation result to the to-be-trained convolutional neural network for learning. The step of calibrating the sky area may specifically include: calibrating a pixel actually belonging to the sky area to 1 and calibrating a pixel belonging to a non-sky area to 0.

In addition, during the training process, since the training image of each sky scene is randomly selected at each iteration, a training image may be selected multiple times while another training image may not be selected during multiple iterations. In this way, over-fitting of the trained convolutional neural network may be prevented, thereby improving the accuracy of segmenting the sky area.

In the embodiment of the present disclosure, before the training, a learning rate of the random gradient descent method may be configured. For example, the learning rate may be 1e-4, etc. A loss function Loss of the random gradient descent method may be defined as:

$$\text{Loss} = \frac{1}{H \times W} \sum_{i \in H, j \in W} (I'_{ij} - I_{ij})^2 \quad (1)$$

In the above formula (1), H is the total number of rows of pixels of the training image, W is the total number of columns of the pixels of the training image, i is a row number of a pixel of the training image, j is a column number of the pixel of the training image, $I_{ij}$ is a real result that a target pixel of which a row number is i and a column number is j belongs to the sky area, $I'_{ij}$ is an output result that the target pixel belongs to the sky area outputted by the iterative convolutional neural network.

For a target pixel in a training image, when the target pixel actually belongs to the sky area, the real result $I_{ij}$ is 1, i.e., the calibration 1 of the sky area. When the target pixel does not actually belong to the sky area, the real result $I_{ij}$ is 0, which is the calibration 1 of the non-sky area. When the target pixel is output as a pixel of the sky area after the target pixel passes through the iterative convolutional neural network, the output result $I'_{ij}$ is 1, which is the calibration 1 of the sky area. When the target pixel is output as a pixel of the non-sky area after the target pixel passes through the iterative convolutional neural network, the output result $I'_{ij}$ is 0.

The loss function Loss may be used for estimating a degree of fit of the convolutional neural network after each iteration. Training images selected at one time may be sequentially input into the to-be-trained convolutional neural network, so that the to-be-trained convolutional neural network may learn the sky area calibrated in the training image. In the to-be-trained convolutional neural network, parameters in the plurality of cascaded second convolutional neural networks are not determined. After the learning is completed, each parameter in the cascaded second convolutional neural networks may be updated, and a value of the loss function Loss at this moment is determined. As such, a first iterative training of the convolutional network is completed. Furthermore, training images may be randomly selected again. The selected training images may be input into the convolutional neural network processed with the first iteration training, so that the convolutional neural network processed with the first iteration training may learn the sky area calibrated in the training images selected this time. After the learning is completed, each parameter in the cascaded second convolutional neural networks after the first iteration training may be updated again, and a value of the loss function Loss at this moment is determined again. As such, a second iterative training of the convolutional network is completed. Along a gradient descent direction of the loss function Loss, the value of the loss function Loss may gradually decrease, and so on, until the number of iterations reaches a preset number, the change of the value of the loss function Loss is small, so that the training is completed. Parameters when the loss function Loss reaches the minimum value are determined as final parameters of the plurality of cascaded second convolutional neural networks. As such, a plurality of trained second convolutional neural networks is obtained, i.e., a convolutional neural network in which all parameters are determined is obtained.

In practice, 20 training images may be randomly selected from each sky scene category for training every time. In other words, a total of 920 frames of target training images are selected from 46 scenes to perform an iteration, and a total of 100 iterations may be performed. As such, 92,000 frames of images participate in the training. The training image adopts a random selection method, which may prevent over-fitting of the convolutional neural network, and improve the accuracy of the convolutional neural network for segmenting the sky area.

After the training is completed, the convolutional neural network may be tested by the test set in the skyFinder data set. A segmentation accuracy rate of the convolutional neural network may reach 98%.

It should be noted that in practice, the first convolutional neural network may be a VGG-19 convolutional neural network in the related art. Correspondingly, a pre-training parameter in the VGG-19 convolutional neural network in the related art may be directly imported into the first convolutional neural network. In other words, the first convolutional neural network may be the trained VGG-19 convolutional neural network. As such, during the process of training the convolutional neural network, the first convolutional neural network is not trained so as to save training time.

Step 202: the image input layer acquires an original image.

In the embodiment of the present disclosure, the original image in which the sky area is to be segmented may be input into the image input layer in the convolutional neural network, so that the image input layer acquires the original image.

Step 203: the first convolutional neural network extracts a plurality of sky feature images with different scales from the original image, in which a scale of each sky feature image is smaller than that of the original image.

In an embodiment of the present disclosure, the plurality of sky feature images may include a first sky feature image, a second sky feature image, a third sky feature image, and a fourth sky feature image. A scale of the first sky feature image is ½ of a scale of the second sky feature image, the scale of the second sky feature image is ½ of a scale of the third sky feature image, and the scale of the third sky feature image is ½ of a scale of the fourth sky feature image.

In practice, the first convolutional neural network may be the VGG-19 convolutional neural network. The VGG-19 convolutional neural network may include 16 convolutional layers with 3×3 convolution kernels, and 3 fully-connected layers. The second convolutional layer, the fourth convolutional layer, the eighth convolutional layer, the twelfth convolutional layer, and the sixteenth convolutional layer are respectively connected to a ½ pooling layer, so that an output image of the second convolution layer, the fourth convolutional layer, the eighth convolutional layer, the twelfth convolutional layer, and the sixteenth convolutional layer is performed with ½ pooling processing, i.e., the scale of the output image is reduced by half. In the embodiment of the present disclosure, the fourth sky feature image is an output image of the fourth convolution layer in the first convolutional neural network. The third sky feature image is an output image of the eighth convolution layer in the first convolutional neural network. The second sky feature image is an output image of the twelfth convolution layer of the first convolutional neural network. The first sky feature image is an output image of the sixteenth convolution layer of the first convolutional neural network.

In an embodiment of the present disclosure, the original image may be input into the VGG-19 convolutional neural network, and the sky feature images outputted by the 4th, 8th, 12th, and 16th convolution layers are obtained therefrom. In this case, the fourth sky feature image outputted by the fourth convolution layer is processed with one ½ pooling, so that the scale of the fourth sky feature image is ½ of the scale of the original image. The third sky feature image output by the eighth convolution layer is processed with two ½ pooling, so that the scale of the third sky feature image is ¼ of the scale of the original image. The second sky feature image output by the twelfth convolutional layer is processed with three ½ pooling, so that the scale of the second sky feature image is ⅛ of the scale of the original image. The first sky feature image output by the sixteenth convolutional layer is processed with four ½ pooling, so that the scale of the first sky feature image is 1/16 of the scale of the original image. Each sky feature image includes a convolution feature of the original image at a corresponding scale.

Step 204: the first-level second convolutional neural network performs feature processing on the first sky feature image and the second sky feature image to obtain a first intermediate target feature image of which a scale is the same as the scale of the second sky feature image.

In the embodiment of the present disclosure, corresponding to the four sky feature images with different scales, the plurality of cascaded second convolutional neural networks may include three levels of the second convolutional neural networks, i.e., the first-level second convolutional neural network, the second-level second convolutional neural network, and the third-level second convolutional neural network. The second convolutional neural network at each level may include a residual convolution unit, a multi-scale fusion unit, a chain residual pooling unit, and a convolution output unit. The residual convolution unit performs global feature extraction on the input feature image. The multi-scale fusion unit performs feature fusion on the feature image output by the residual convolution unit. The chain residual pooling unit performs low frequency feature extraction on the feature image output by the multi-scale fusion unit. The convolution output unit may convolve the feature image output by the chain residual pooling unit to obtain an intermediate target feature image or a target feature image.

Specifically, the residual convolution unit may include a first activation function subunit, a first convolution subunit, a first batch normalization (BN) subunit, a second activation function subunit, a second convolution subunit, a second BN subunit, and a first superposition subunit. The first activation function subunit may perform nonlinear processing on the input feature image. The first convolution subunit may convolve the feature image output by the first activation function subunit. The first BN subunit may perform regularization processing on the feature image output by the first convolution subunit. The second activation function subunit may perform nonlinear processing on the feature image output by the first BM subunit. The second convolution subunit may convolve the feature image output by the second activation function subunit. The second BN subunit may perform regularization processing on the feature image output by the second convolution subunit. The first superposition subunit may perform feature superposition on the feature image input into the first activation function subunit and the feature image output by the second BN subunit.

At this step, the first sky feature image with 1/16 scale may be input into the first activation function subunit, so that the first activation function subunit may perform nonlinear processing on the first sky feature image, and output a feature image with a nonlinear feature. The feature image then may be input into the first convolution subunit, so that the first convolution subunit may convolve the feature image output by the first activation function subunit, and output a feature image with a convolution feature. The feature image then may be input into the first BN subunit, so that the first batch normalization subunit may perform regularization processing on the feature image output by the first convolution subunit, and output a feature image with feature regularization. The feature image then may be input into the second activation function subunit, so that the second activation function subunit may perform nonlinear processing on the feature image output by the first batch normalization subunit, and output a feature image with a nonlinear feature. The feature image then may be input into the second convolution subunit, so that the second convolution subunit may convolve the feature image output by the second activation function subunit and output a feature image with a convolution feature. The feature image then may be input into the second batch normalization subunit, so that the second batch normalization subunit may perform regularization processing on the feature image output by the second convolution subunit and output a feature image with feature regularization. The feature image then may be input into the first superposition subunit, so that the first superposition subunit may perform feature superposition on the first sky feature image input into the first activation function subunit and the feature image output by the second BN subunit, and output a feature image with a superposition feature. As such, global feature extraction may be performed on the first sky feature image.

Similarly, the residual convolution unit may also perform global feature extraction on the second sky feature image with ⅛ scale through the above described manner. In practice, each level of the second convolutional neural network may include two residual convolution units, so that the global feature extraction may be simultaneously performed on the first sky feature image with 1/16 scale and the second sky feature image with ⅛ scale through the two residual convolution units.

It should be noted that, since there is not a subunit for reducing the image size in the residual convolution unit, the scale of the image output by each subunit in the residual convolution unit is the same as the scale of the feature image input into the residual convolution unit. For example, when the first sky feature image with the 1/16 scale is input into the residual convolution unit, the scale of the image output by the residual convolution unit is 1/16 of the scale of the original image; when the second sky feature image with the ⅛ scale is input into the residual convolution unit, the scale of the image output by the residual convolution unit is ⅛ of the scale of the original image.

It should be noted that the step of performing feature fusion on the two feature images specifically refers to adding pixel values of pixels in the same position in the two feature images, thereby using the sum of pixel values of each position to form a new feature image. In other words, for a pixel of which a position is (i, j) in the new feature image, a pixel value of the pixel is equal to the sum of a pixel value of a pixel of which a position is (i, j) in the first feature image and a pixel value of a pixel of which a position is (i, j) in the second feature image, thereby achieving feature fusion of the two feature images. The pixel value of the pixel refers specifically to a RGB (Red Green Blue) value of the pixel, i.e., R components, G components, and B components of the pixels in the same position in the two feature images are added respectively to obtain a RGB value of the new pixel.

The main function of the residual convolution unit is to perform further feature extraction on the input sky feature image through the residual method. The residual convolution unit may superimpose the input image with the final convolution result of the layer. As such, the output of the residual convolution unit is a global semantic feature.

The first activation function subunit and the second activation function subunit may perform nonlinear processing on the input feature image to increase the nonlinearity of the depth network, so that the output result of the depth network is more in line with the nonlinear law of the real result. In practice, an activation function in the first activation function subunit and the second activation function subunit may be a Relu function. In practice, a size of a convolution kernel of the first convolution subunit and the second convolution subunit may be 3×3, or other sizes. The first BN subunit and the second BN subunit may perform regularization processing on the convolved feature image. By setting a BN subunit after each convolution subunit, a gradient explosion during the training of the convolutional neural network may be avoided.

Further, the multi-scale fusion unit may include a third convolution subunit, a fourth convolution subunit, an up-sampling subunit, and a second superposition subunit. The third convolution subunit may convolve a feature image with the larger scale in the feature images output by the residual convolution unit. The fourth convolution subunit may convolve a feature image with the smaller scale in the feature images output by the residual convolution unit. The up-sampling subunit may up-sample the feature image output by the fourth convolution subunit. The second superimposing subunit may perform feature superimposition on the feature image output by the third convolution subunit and the feature image output by the up-sampling subunit.

In this step, the ⅛-scale feature image output by the residual convolution unit may be input into the third convolution subunit, so that the third convolution subunit may convolve the ⅛-scale feature image and output a feature image with a convolution feature. The 1/16-scale feature image output by the residual convolution unit may also be input into the fourth convolution subunit, so that the fourth convolution subunit may convolve the 1/16-scale feature image and output a feature image with a convolution feature. Then the feature image output by the fourth convolution subunit may be input into the up-sampling subunit, so that the up-sampling subunit may up-sample the feature image output by the fourth convolution subunit, and output a ⅛-scale feature image of which a scale is doubled. Then the ⅛-scale feature image output by the third convolution subunit and the ⅛-scale feature image output by the up-sampling subunit may be input into the second superposition subunit, so that the second superposition subunit may perform feature superposition on the two ⅛-scale feature images, and output a ⅛-scale feature image with a superposition feature. So far, feature fusion may be performed on the feature images output by the residual convolution unit.

Further, the chain residual pooling unit may include a first pooling subunit, a fifth convolution subunit, a third superposition subunit, a third BN subunit, a second pooling subunit, a sixth convolution subunit, a fourth BN subunit, and a fourth superposition subunit. The first pooling subunit may perform pooling processing on the feature image output by the multi-scale fusion unit. The fifth convolution subunit may convolve the feature image output by the first pooling subunit. The third BN subunit may perform regularization processing on the feature image output by the fifth convolution subunit. The third superposition subunit may perform feature superposition on the feature image output by the multi-scale fusion unit and the feature image output by the third BN subunit. The second pooling subunit may perform pooling processing on the feature image output by the third BN subunit. The sixth convolution subunit may convolve the feature image output by the second pooling subunit. The fourth BN subunit may perform regularization processing on the feature image output by the sixth convolution subunit. The fourth superposition subunit may perform feature superimposition on the feature image output by the third superposition subunit and the feature image output by the fourth BN subunit.

In this step, the feature image output by the multi-scale fusion unit may be input into the first pooling subunit, so that the first pooling subunit may perform pooling processing on the feature image output by the multi-scale fusion unit. After the pooling processing, the size of the feature image is reduced. One or more circles of pixels with a pixel value (0, 0, 0) may be added around the feature image, so that the scale of the feature image with an aggregation feature output by the first pooling subunit is the same as the scale of the image input into the first pooling subunit. Then the feature image output by the first pooling subunit may be input to the fifth convolution subunit, so that the fifth convolution subunit may convolve the feature image output by the first pooling subunit and output a feature image with a convolution feature. Then the feature image may be input to the third BN subunit, so that the third BN subunit may perform regularization processing on the feature image output by the fifth convolution subunit and output a feature image with feature regularization. Then the feature image may be input to the third superposition subunit, so that the third superposition subunit may perform feature superposition on the feature image output by the multi-scale fusion unit and the feature image output by the third BN subunit, i.e., feature fusion, and output a feature image with a superimposition feature. Then the feature image may be input to the second pooling subunit, so that the second pooling subunit may perform pooling processing on the feature image output by the third batch normalization subunit. After the pooling processing, the size of the feature image is reduced. One or more circles of pixels with a pixel value (0, 0, 0) may be added around the feature image, so that the scale of the feature image with an aggregation feature output by the second pooling subunit is the same as the scale of the image input into the first pooling subunit. Then the feature image output by the second pooling subunit may be input to the sixth convolution subunit, so that the sixth convolution subunit may convolve the feature image output by the second pooling subunit and output a feature image with a convolution feature. Then the feature image may be input to the fourth BN subunit, so that the fourth BN subunit may perform regularization processing on the feature image output by the sixth convolution subunit and output a feature image with feature regularization. Then the feature image may be input to the fourth superposition subunit, so that the fourth superposition subunit may perform feature superposition on the feature image output by the third superposition subunit and the feature image output by the fourth BN subunit, and output a feature image with a superimposition feature. As such, low-frequency feature extraction may be performed on the feature image output by the multi-scale fusion unit.

A scale of a feature image output by each subunit in the chain residual pooling unit is the same as the scale of the feature image input into the chain residual pooling unit. After the ⅛-scale feature image output by the multi-scale fusion unit is input to the chain residual pooling unit, the chain residual pooling unit may output a ⅛-scale feature image.

The main function of the chain residual pooling unit is to obtain a low-frequency semantic feature in the input feature image through the pooling process, and fuse it with a feature of the input feature image through a residual convolution method to obtain a global low-frequency semantic feature. The chain residual pooling unit may perform feature fusion on the input feature image and the feature image after the first convolution, and then perform the feature fusion on the feature image after the feature fusion and the feature image after the second convolution, thereby obtaining the global low-frequency semantic feature.

The first pooling subunit and the second pooling subunit may perform pooling processing on the input feature image. In practice, an image input block of the first pooling subunit and the second pooling subunit may be 5×5, or other sizes. In practice, a convolution kernel of the fifth convolution subunit and the sixth convolution subunit may be 3×3, or other sizes. The third batch normalization subunit and the fourth batch normalization subunit may perform regularization processing on the convolved feature image. By setting a batch normalization layer after each convolution layer, a gradient explosion during the training of the deep network is avoided.

Further, in this step, the convolution output unit may specifically include a seventh convolution subunit, which may convolve the feature image output by the chain residual pooling unit to obtain an intermediate target feature image with a convolution feature or a target feature image with a convolution feature. A convolution output unit of the first-level second convolutional neural network may output a first intermediate target feature image, a convolution output unit of the second-level second convolutional neural network may output a second intermediate target feature image, and a convolution output unit of the third-level second convolutional neural network may output the target feature image. The first intermediate target feature image may be one of the input images of the second-level second convolutional neural network, and the second intermediate target feature image may be one of the input images of the third-level second convolutional neural network.

Since the convolution processing does not change the scale of the feature image, the scale of the feature image output by the convolution output unit is the same as the scale of the feature image input into the convolution output unit. After the ⅛-scale feature image output by the chain residual pooling unit is input to the convolution output unit, the convolution output unit may output a ⅛-scale feature image. In practice, a convolution kernel of the convolution output unit may be 3×3 in size, or other sizes.

So far, the first intermediate target feature image is obtained through the first-level second convolutional neural network.

Step 205: the second-level second convolutional neural network performs feature processing on the first intermediate target feature image and the third sky feature image to obtain the second intermediate target feature image with the same scale as that of the third sky feature image.

In an embodiment of the present disclosure, the second-level second convolutional neural network also includes a residual convolution unit, a multi-scale fusion unit, a chain residual pooling unit, and a convolution output unit. The process of feature processing performed by the second-level second convolutional neural network on the first intermediate target feature image and the third sky feature image is the same as the process of feature processing performed by the first-level second convolutional neural network on the first sky feature image and the second sky feature image in step 204, which is not repeated herein.

In practice, the ⅛-scale first intermediate target feature image and the ¼-scale third sky feature image may be input into the second-level second convolutional neural network, so that the second-level second convolution neural network may perform feature processing on the first intermediate target feature image and the third sky feature image, and output the ¼-scale second intermediate target feature image. The scale of the second intermediate target feature image is ¼ of the scale of the original image, and is the same as the scale of the third sky feature image.

Step 206: the third-level second convolutional neural network performs feature processing on the second intermediate target feature image and the fourth sky feature image to obtain the target feature image with the same scale as that of the fourth sky feature image.

In an embodiment of the present disclosure, the third-level second convolutional neural network also includes a residual convolution unit, a multi-scale fusion unit, a chain residual pooling unit, and a convolution output unit. The process of feature processing performed by the third-level second convolutional neural network on the second intermediate target feature image and the fourth sky feature image is the same as the process of feature processing performed by the first-level second convolutional neural network on the first sky feature image and the second sky feature image in step 204, which is not repeated herein.

In practice, the ¼-scale second intermediate target feature image and the ½-scale fourth sky feature image may be input into the third-level second convolutional neural network, so that the third-level second convolution neural network may perform feature processing on the second intermediate target feature image and the fourth sky feature image, and output the ½-scale target feature image. The scale of the target feature image is ½ of the scale of the original image, and is the same as the scale of the fourth sky feature image.

Step 207: the up-sampling layer up-samples the target feature image to obtain an up-sampled feature image of which a scale is the same as that of the original image.

In an embodiment of the present disclosure, after obtaining the target feature image through the plurality of cascaded second convolutional neural networks, the up-sampling layer in the convolutional neural network may up-sample the target feature image, thereby expanding the scale of the target feature image. The scale of the expanded target feature is the same as the scale of the original image, i.e., the up-sampled feature image of which the scale is the same as that of the original image is obtained.

Step 208: the sky area determining layer determines a pixel area of which a gray value is greater than or equal to a preset gray value in the up-sampled feature image as the sky area.

In an embodiment of the present disclosure, the sky area determining layer may be a binarization mask layer. After the up-sampled feature image is input to the binarization mask layer, the up-sampled feature image may be binarized. In the binarized mask image obtained after the binarization processing, a pixel area of which a gray value is greater than or equal to the preset gray value is filled with white pixels, of which gray values are all 255; a pixel area of which a gray value is smaller than the preset gray value is filled with black pixels, of which gray values are all 0. Further, the processing device may determine the white pixel area in the binarized mask image as the sky area, thereby segmenting the sky area of the original image.

In the embodiment of the present disclosure, the convolutional neural network may be trained by the random gradient descent method using the training image of the sky scene to obtain the trained convolutional neural network, and then the original image may be acquired. Multiple sky feature images with different scales are extracted from the original image through the first convolutional neural network. The multiple sky feature images are processed through the multiple cascaded second convolutional neural networks to output a target feature image. The target feature image is up-sampled to obtain the up-sampled feature image of which the scale is the same as the scale of the original image. The pixel area of which the gray value is greater than or equal to the preset gray value in the up-sampled feature image is determined as the sky area. In the embodiment of the present disclosure, multiple sky feature images with different scales may be extracted. The multiple sky feature images are processed through a plurality of cascaded second convolutional neural networks. The sky semantic features in the original image may be extracted, at multiple levels, from images with different scales. Thus, the output target feature image may include sky features with various scales, which is conducive to accurately determine the sky boundary in dense fog and dark night scenes. As such, the sky area in the scenes of dense fog and dark night may be segmented accurately.

Figure 3:
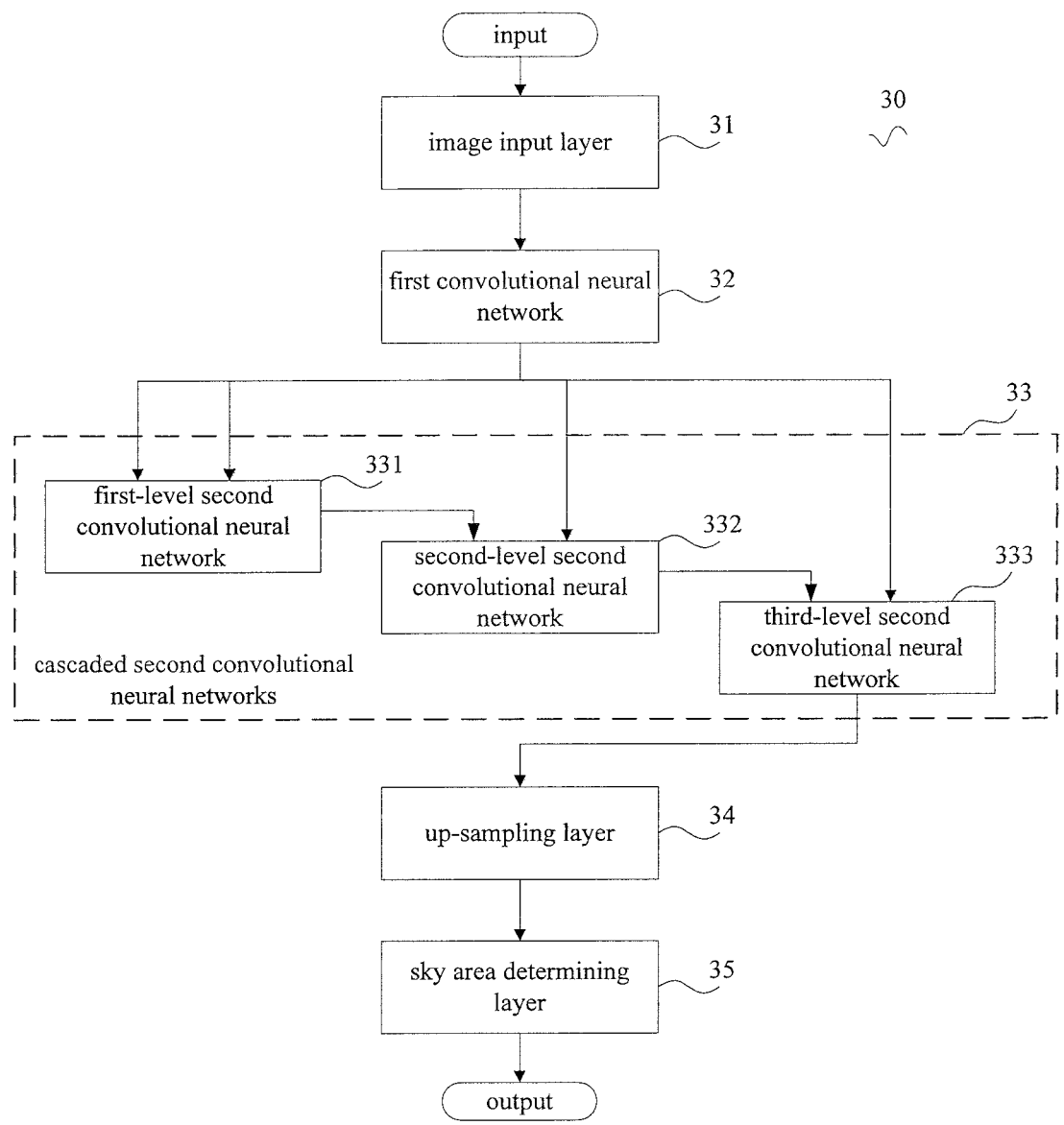
FIG. 3 is a block diagram illustrating structure of a convolutional neural network for segmenting a sky area according to an embodiment of the present disclosure.

FIG. 3 is a block diagram illustrating structure of a convolutional neural network (which may also be referred as a convolutional neural network processor) for segmenting a sky area according to an embodiment of the present disclosure. The convolutional neural network 30 includes:

an image input layer 31, to acquire an original image;

a first convolutional neural network 32, to extract a plurality of sky feature images with different scales from the original image, wherein a scale of each sky feature image is smaller than a scale of the original image;

a plurality of cascaded second convolutional neural networks 33, to process the plurality of sky feature images to output a target feature image, wherein a scale of the target feature image is the same as a maximum scale in the plurality of sky feature images;

an up-sampling layer 34, to up-sample the target feature image to obtain an up-sampled feature image of which a scale is the same as the scale of the original image; and a sky area determining layer 35, to determine a pixel area of which a gray value is greater than or equal to a preset gray value in the up-sampled feature image as a sky area.

Optionally, the plurality of sky feature images include a first sky feature image, a second sky feature image, a third sky feature image, and a fourth sky feature image; a scale of the first sky feature image is ½ of a scale of the second sky feature image, the scale of the second sky feature image is ½ of a scale of the third sky feature image, the scale of the third sky feature image is ½ of a scale of the fourth sky feature image; referring to FIG. 3, the plurality of cascaded second convolutional neural networks 33 includes three levels of the second convolutional neural networks;

a first-level second convolutional neural network 331 is to perform feature processing on the first sky feature image and the second sky feature image to obtain a first intermediate target feature image of which a scale is the same as the scale of the second sky feature image;

a second-level second convolutional neural network 332 is to perform the feature processing on the first intermediate target feature image and the third sky feature image to obtain a second intermediate target feature image of which a scale is the same as the scale of the third sky feature image;

a third-level second convolutional neural network 333 is to perform the feature processing on the second intermediate target feature image and the fourth sky feature image to obtain the target feature image of which the scale is the same as the scale of the fourth sky feature image.

Optionally, the first convolutional neural network is a VGG-19 convolutional neural network; the fourth sky feature image is an output image of a fourth convolution layer in the first convolutional neural network, the third sky feature image is an output image of an eighth convolution layer in the first convolutional neural network, the second sky feature image is an output image of a twelfth convolution layer in the first convolutional neural network, and the first sky feature image is an output image of a sixteenth convolution layer in the first convolutional neural network.

Optionally, the scale of the fourth sky feature image is ½ of the scale of the original image, the scale of the third sky feature image is ¼ of the scale of the original image, the scale of the second sky feature image is ⅛ of the scale of the original image, the scale of the first sky feature image is 1/16 of the scale of the original image.

Figure 4:
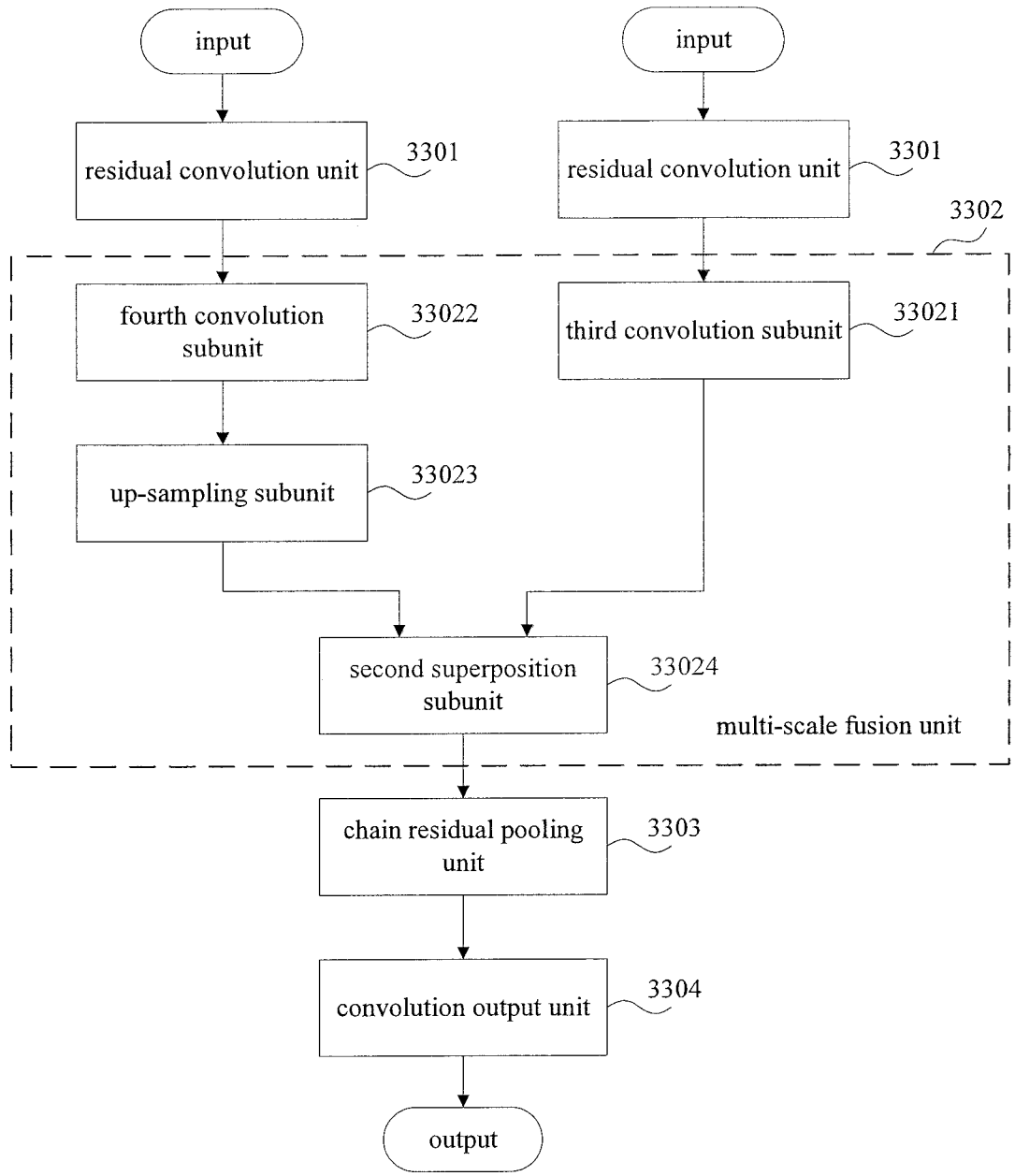
FIG. 4 is a block diagram illustrating structure of a second convolutional neural network according to an embodiment of the present disclosure.

Optionally, referring to FIG. 4, the second convolutional neural network at each level includes:

a residual convolution unit 3301, to perform global feature extraction on the input feature image;

a multi-scale fusion unit 3302, to perform feature fusion on a feature image output by the residual convolution unit;

a chain residual pooling unit 3303, to perform low-frequency feature extraction on a feature image output by the multi-scale fusion unit; and a convolution output unit 3304, to convolve a feature image output by the chain residual pooling unit to obtain an intermediate target feature image or the target feature image.

Figure 5:
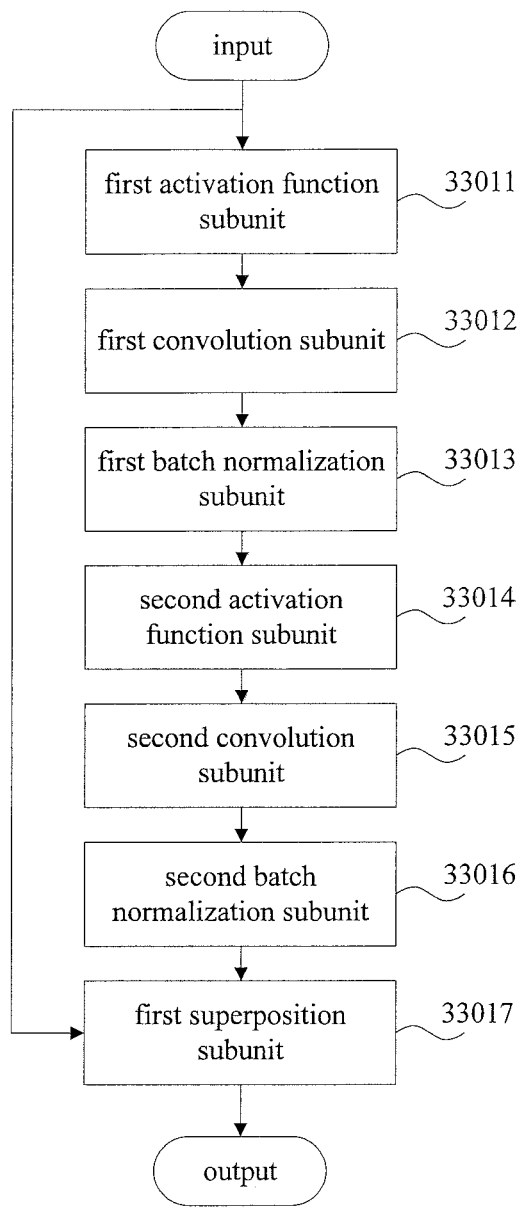
FIG. 5 is a block diagram illustrating structure of a residual convolution unit according to an embodiment of the present disclosure.

Optionally, referring to FIG. 5, the residual convolution unit 3301 includes:

a first activation function subunit 33011, to perform nonlinear processing on the input feature image;

a first convolution subunit 33012, to convolve a feature image output by the first activation function subunit;

a first batch normalization subunit 33013, to perform regularization processing on a feature image output by the first convolution subunit;

a second activation function subunit 33014, to perform nonlinear processing on a feature image output by the first BM subunit;

a second convolution subunit 33015, to convolve a feature image output by the second activation function subunit;

a second BN subunit 33016, to perform regularization processing on a feature image output by the second convolution subunit; and a first superposition subunit 33017, to perform feature superposition on the feature image input into the first activation function subunit and a feature image output by the second BN subunit.

Optionally, referring to FIG. 4, the multi-scale fusion unit 3302 includes:

a third convolution subunit 33021, to convolve a feature image with a larger scale in feature images output by the residual convolution unit;

a fourth convolution subunit 33022, to convolve a feature image with a smaller scale in the feature images output by the residual convolution unit;

an up-sampling subunit 33023, to up-sample a feature image output by the fourth convolution subunit; and a second superposition subunit 33024, to perform feature superimposition on a feature image output by the third convolution subunit and a feature image output by the up-sampling subunit.

Figure 6:
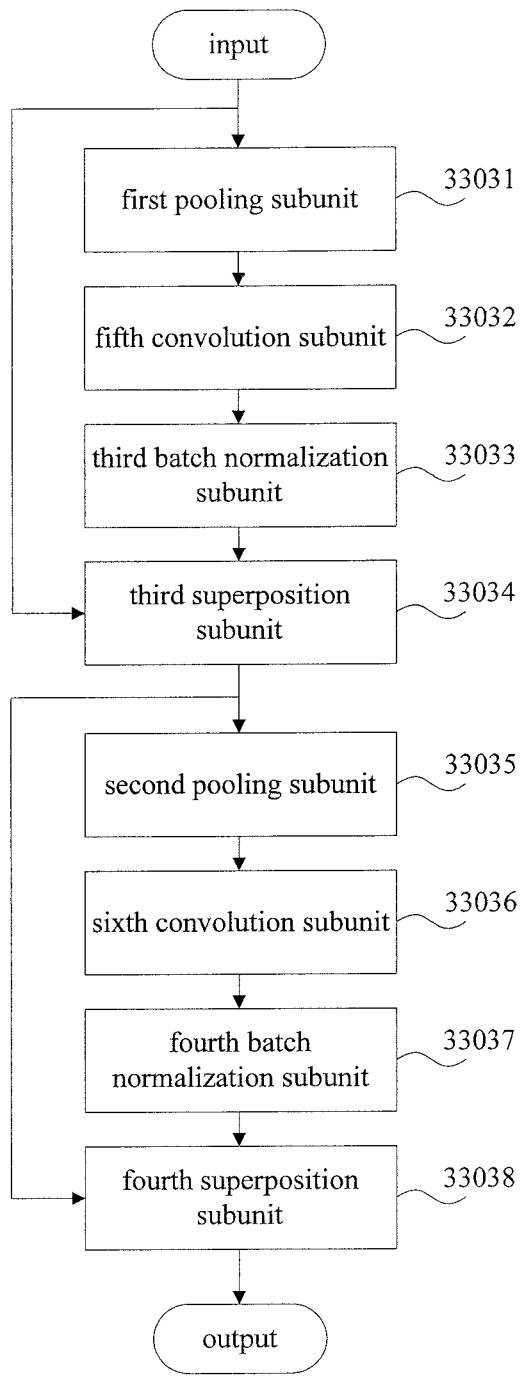
FIG. 6 is a block diagram illustrating structure of a chain residual pooling unit according to an embodiment of the present disclosure.

Optionally, referring to FIG. 6, the chain residual pooling unit 3303 includes:

a first pooling subunit 33031, to perform pooling processing on a feature image output by the multi-scale fusion unit;

a fifth convolution subunit 33032, to convolve a feature image output by the first pooling subunit;

a third BN subunit 33033, to perform regularization processing on a feature image output by the fifth convolution subunit;

a third superposition subunit 33034, to perform feature superposition on a feature image output by the multi-scale fusion unit and a feature image output by the third BN subunit;

a second pooling subunit 33035, to perform pooling processing on a feature image output by the third BN subunit;

a sixth convolution subunit 33036, to convolve a feature image output by the second pooling subunit;

a fourth BN subunit 33037, to perform regularization processing on a feature image output by the sixth convolution subunit; and a fourth superposition subunit 33038, to perform feature superimposition on a feature image output by the third superposition subunit and a feature image output by the fourth BN subunit.

Optionally, the convolutional neural network 30 further includes:

a network training layer, to train the convolutional neural network by a random gradient descent method using a training image of a sky scene.

Optionally, a loss function Loss of the random gradient descent method is:

$$Loss = \frac{1}{H \times W} \sum_{i \in H, j \in W} (I'_{ij} - I_{ij})^2$$

wherein H is the total number of rows of pixels of the training image, W is the total number of columns of the pixels of the training image, i is a row number of a pixel of the training image, j is a column number of the pixel of the training image, $I_{ij}$ is a real result that a target pixel of which a row number is i and a column number is j belongs to the sky area, $I'_{ij}$ is an output result that the target pixel belongs to the sky area outputted by the iterative convolutional neural network.

In the embodiment of the present disclosure, the original image may be first acquired through the image input layer. Multiple sky feature images with different scales are extracted from the original image through the first convolutional neural network. The multiple sky feature images are processed through the multiple cascaded second convolutional neural networks to output a target feature image. The target feature image is up-sampled to obtain the up-sampled feature image of which the scale is the same as the scale of the original image. The pixel area of which the gray value is greater than or equal to the preset gray value in the up-sampled feature image is determined as the sky area through the sky area determining layer. In the embodiment of the present disclosure, multiple sky feature images with different scales may be extracted. The multiple sky feature images are processed through a plurality of cascaded second convolutional neural networks. The sky semantic features in the original image may be extracted, at multiple levels, from images with different scales. Thus, the output target feature image may include sky features with various scales, which is conducive to accurately determine the sky boundary in dense fog and dark night scenes. As such, the sky area in the scenes of dense fog and dark night may be segmented accurately.

An apparatus for segmenting a sky area based on a convolutional neural network, comprising: a memory; and a processor, wherein the convolutional neural network comprises an image input layer, a first convolutional neural network, a plurality of cascaded second convolutional neural networks, an up-sampling layer, and a sky area determining layer, the memory is configured to a store computer program executable on the processor, the computer program, when executed by the processor, causes the processor to perform operations of:

acquiring, by the image input layer, an original image;

extracting, by the first convolutional neural network, a plurality of sky feature images with different scales from the original image, wherein a scale of each sky feature image is smaller than a scale of the original image;

processing, by the plurality of cascaded second convolutional neural networks, the plurality of sky feature images to output a target feature image, wherein a scale of the target feature image is the same as a maximum scale in the plurality of sky feature images;

up-sampling, by the up-sampling layer, the target feature image to obtain an up-sampled feature image of which a scale is the same as the scale of the original image; and determining, by the sky area determining layer, a pixel area of which a gray value is greater than or equal to a preset gray value in the up-sampled feature image as a sky area.

Figure 7:
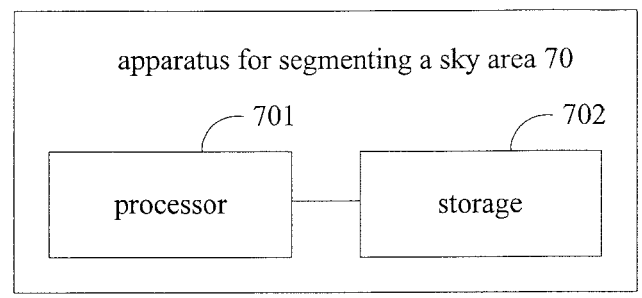
FIG. 7 is a block diagram illustrating structure of an apparatus for segmenting a sky area based on a convolutional neural network according to an embodiment of the present disclosure.

FIG. 7 is a block diagram illustrating structure of an apparatus for segmenting a sky area based on a convolutional neural network according to an embodiment of the present disclosure. The apparatus 70 includes a processor 701 and a storage 702, in which the processor 701 is connected to the storage 702 via a bus, the storage 702 stores execution instructions of the method for segmenting a sky area based on a convolutional neural network, the processor 701 executes the execution instructions; the convolutional neural network includes an image input layer, a first convolutional neural network, a plurality of cascaded second convolutional neural networks, an up-sampling layer, and a sky area determining layer, the processor 701 includes:

an acquiring module, to control the image input layer to acquire an original image;

an extracting module, to control the first convolutional neural network to extract a plurality of sky feature images with different scales from the original image, wherein a scale of each sky feature image is smaller than a scale of the original image;

a processing module, to control the plurality of cascaded second convolutional neural networks to process the plurality of sky feature images to output a target feature image, wherein a scale of the target feature image is the same as a maximum scale in the plurality of sky feature images;

an up-sampling module, to control the up-sampling layer to up-sample the target feature image to obtain an up-sampled feature image of which a scale is the same as the scale of the original image; and a determining module, to control the sky area determining layer to determine a pixel area of which a gray value is greater than or equal to a preset gray value in the up-sampled feature image as a sky area.

Optionally, the plurality of sky feature images include a first sky feature image, a second sky feature image, a third sky feature image, and a fourth sky feature image; a scale of the first sky feature image is ½ of a scale of the second sky feature image, the scale of the second sky feature image is ½ of a scale of the third sky feature image, the scale of the third sky feature image is ½ of a scale of the fourth sky feature image, the plurality of cascaded second convolutional neural networks include three levels of the second convolutional neural networks;

the processing module includes:

a first feature processing sub-module, to control a first-level second convolutional neural network to perform feature processing on the first sky feature image and the second sky feature image to obtain a first intermediate target feature image of which a scale is the same as the scale of the second sky feature image;

a second feature processing sub-module, to control a second-level second convolutional neural network to perform the feature processing on the first intermediate target feature image and the third sky feature image to obtain a second intermediate target feature image of which a scale is the same as the scale of the third sky feature image;

a third feature processing sub-module, to control a third-level second convolutional neural network to perform the feature processing on the second intermediate target feature image and the fourth sky feature image to obtain the target feature image of which the scale is the same as the scale of the fourth sky feature image.

Optionally, the first convolutional neural network is a VGG-19 convolutional neural network; the fourth sky feature image is an output image of a fourth convolution layer in the first convolutional neural network, the third sky feature image is an output image of an eighth convolution layer in the first convolutional neural network, the second sky feature image is an output image of a twelfth convolution layer in the first convolutional neural network, and the first sky feature image is an output image of a sixteenth convolution layer in the first convolutional neural network.

Optionally, the scale of the fourth sky feature image is ½ of the scale of the original image, the scale of the third sky feature image is ¼ of the scale of the original image, the scale of the second sky feature image is ⅛ of the scale of the original image, the scale of the first sky feature image is 1/16 of the scale of the original image.

Optionally, the second convolutional neural network at each level includes:

a residual convolution unit, to perform global feature extraction on the input feature image;

a multi-scale fusion unit, to perform feature fusion on a feature image output by the residual convolution unit;

a chain residual pooling unit, to perform low-frequency feature extraction on a feature image output by the multi-scale fusion unit; and a convolution output unit, to convolve a feature image output by the chain residual pooling unit to obtain an intermediate target feature image or the target feature image.

Optionally, the residual convolution unit includes:

a first activation function subunit, to perform nonlinear processing on the input feature image;

a first convolution subunit, to convolve a feature image output by the first activation function subunit;

a first batch normalization (BN) subunit, to perform regularization processing on a feature image output by the first convolution subunit;

a second activation function subunit, to perform nonlinear processing on a feature image output by the first BM subunit;

a second convolution subunit, to convolve a feature image output by the second activation function subunit;

a second BN subunit, to perform regularization processing on a feature image output by the second convolution subunit; and a first superposition subunit, to perform feature superposition on the feature image input into the first activation function subunit and a feature image output by the second BN subunit.

Optionally, the multi-scale fusion unit includes:

a third convolution subunit, to convolve a feature image with a larger scale in feature images output by the residual convolution unit;

a fourth convolution subunit, to convolve a feature image with a smaller scale in the feature images output by the residual convolution unit;

an up-sampling subunit, to up-sample a feature image output by the fourth convolution subunit; and a second superposition subunit, to perform feature superimposition on a feature image output by the third convolution subunit and a feature image output by the up-sampling subunit.

Optionally, the chain residual pooling unit includes:

a first pooling subunit, to perform pooling processing on a feature image output by the multi-scale fusion unit;

a fifth convolution subunit, to convolve a feature image output by the first pooling subunit;

a third BN subunit, to perform regularization processing on a feature image output by the fifth convolution subunit;

a third superposition subunit, to perform feature superposition on a feature image output by the multi-scale fusion unit and a feature image output by the third BN subunit;

a second pooling subunit, to perform pooling processing on a feature image output by the third BN subunit;

a sixth convolution subunit, to convolve a feature image output by the second pooling subunit;

a fourth BN subunit, to perform regularization processing on a feature image output by the sixth convolution subunit; and a fourth superposition subunit, to perform feature superimposition on a feature image output by the third superposition subunit and a feature image output by the fourth BN subunit.

Optionally, the apparatus further includes:

a training module, to train the convolutional neural network by a random gradient descent method using a training image of a sky scene.

Optionally, a loss function Loss of the random gradient descent method is:

$$Loss = \frac{1}{H \times W} \sum_{i \in H, j \in W} (I'_{ij} - I_{ij})^2$$

wherein H is the total number of rows of pixels of the training image, W is the total number of columns of the pixels of the training image, i is a row number of a pixel of the training image, j is a column number of the pixel of the training image, $I_{ij}$ is a real result that a target pixel of which a row number is i and a column number is j belongs to the sky area, $I'_{ij}$ is an output result that the target pixel belongs to the sky area outputted by the iterative convolutional neural network.

For the sake of brevity, the foregoing method embodiments are described as a series of combinations of actions. However, those skilled in the art should understand that the present disclosure is not limited by the described order of actions. According to the present disclosure, some steps can be performed in other orders or at the same time. In addition, those skilled in the art should also understand that the embodiments described in the disclosure are exemplary embodiments, and the actions and modules involved are not necessarily required by the present disclosure.

The various embodiments in the present disclosure are described in a progressive manner Each embodiment focuses on differences from other embodiments. The same or similar parts between the various embodiments can be referred to each other.

Finally, it should also be noted that in the present disclosure, relational terms such as first and second are used merely to distinguish one entity or operation from another entity or operation, and do not necessarily require or imply there is any such actual relationship or order among these entities or operations. Furthermore, the terms "comprise", "include" or any other variations are intended to encompass a non-exclusive inclusion, such that a process, method, commodity, or device that include a series of elements include not only those elements but also other elements that are not explicitly listed, or elements that are inherent to such process, method, commodity, or device. Without more restrictions, an element defined by the phrase "include a . . . " does not exclude the presence of an additional equivalent element in the process, method, commodity, or device including the element.

The method and apparatus for segmenting a sky area, and a convolutional neural network provided by the present disclosure are described in detail above. The principle and implementation manner of the present disclosure are described with reference to the embodiments. The above description of the embodiments is used for helping understanding of the method and its main idea. At the same time, in the light of the idea of the present disclosure, those skilled in the art can make changes in the specific embodiments and application scopes. In view of the above, contents of the present disclosure should not be construed as limiting the present disclosure.

What is claimed is:

1. A method for segmenting a sky area based on a convolutional neural network, wherein the convolutional neural network comprises an image input layer, a first convolutional neural network, a plurality of cascaded second convolutional neural networks, an up-sampling layer, and a sky area determining layer, the first convolutional neural network is a VGG-19 convolutional neural network; the method comprises:

acquiring, by the image input layer, an original image;

extracting, by the first convolutional neural network, a plurality of sky feature images with different scales from the original image, wherein a scale of each sky feature image is smaller than a scale of the original image;

processing, by the plurality of cascaded second convolutional neural networks, the plurality of sky feature images to output a target feature image, wherein a scale of the target feature image is the same as a maximum scale in the plurality of sky feature images;

up-sampling, by the up-sampling layer, the target feature image to obtain an up-sampled feature image of which a scale is the same as the scale of the original image; and determining, by the sky area determining layer, a pixel area of which a gray value is greater than or equal to a preset gray value in the up-sampled feature image as a sky area;

wherein the plurality of sky feature images comprise a first sky feature image, a second sky feature image, a third sky feature image, and a fourth sky feature image: a scale of the first sky feature image is ½ of a scale of the second sky feature image, the scale of the second sky feature image is ½ of a scale of the third sky feature image, the scale of the third sky feature image is ½ of a scale of the fourth sky feature image, the fourth sky feature image is an output image of a fourth convolution layer in the first convolutional neural network, the third sky feature image is an output image of an eighth convolution layer in the first convolutional neural network, the second sky feature image is an output image of a twelfth convolution layer in the first convolutional neural network, the first sky feature image is an output image of a sixteenth convolution layer in the first convolutional neural network, and the plurality of cascaded second convolutional neural networks comprises three levels of second convolutional neural networks;

wherein the processing, by the plurality of cascaded second convolutional neural networks, the plurality of sky feature images to output a target feature image comprises:

performing, by a first-level second convolutional neural network, feature processing on the first sky feature image and the second sky feature image to obtain a first intermediate target feature image of which a scale is the same as the scale of the second sky feature image;

performing, by a second-level second convolutional neural network, the feature processing on the first intermediate target feature image and the third sky feature image to obtain a second intermediate target feature image of which a scale is the same as the scale of the third sky feature image; and performing, by a third-level second convolutional neural network, the feature processing on the second intermediate target feature image and the fourth sky feature image to obtain the target feature image of which the scale is the same as the scale of the fourth sky feature image.

2. The method of claim 1, wherein the scale of the fourth sky feature image is ½ of the scale of the original image, the scale of the third sky feature image is ¼ of the scale of the original image, the scale of the second sky feature image is ⅛ of the scale of the original image, the scale of the first sky feature image is ¹⁄₁₆ of the scale of the original image.

3. The method of claim 1, wherein each of the plurality of cascaded second convolutional neural networks comprises a residual convolution unit, a multi-scale fusion unit, a chain residual pooling unit, and a convolution output unit;
wherein the processing, by the plurality of cascaded second convolutional neural networks, the plurality of sky feature images to output the target feature image comprises:
performing, through the residual convolution unit, global feature extraction on the input feature image;
performing, through the multi-scale fusion unit, feature fusion on a feature image output by the residual convolution unit;
performing, through the chain residual pooling unit, low-frequency feature extraction on a feature image output by the multi-scale fusion unit;
convolving, through the convolution output unit, a feature image output by the chain residual pooling unit to obtain an intermediate target feature image or the target feature image.

4. The method of claim 3, wherein the residual convolution unit comprises a first activation function subunit, a first convolution subunit, a first batch normalization (BN) subunit, a second activation function subunit, a second convolution subunit, a second BN subunit, and a first superposition subunit;
wherein the performing, through the residual convolution unit, global feature extraction on the input feature image comprises:
performing, through the first activation function subunit, nonlinear processing on the input feature image;
convolving, through the first convolution subunit, a feature image output by the first activation function subunit;
performing, through the first BN subunit, regularization processing on a feature image output by the first convolution subunit;
performing, through the second activation function subunit, nonlinear processing on a feature image output by the first BM subunit;
convolving, through the second convolution subunit, a feature image output by the second activation function subunit;
performing, through the second BN subunit, regularization processing on a feature image output by the second convolution subunit; and
performing, through the first superposition subunit, feature superposition on the feature image input into the first activation function subunit and a feature image output by the second BN subunit, and outputting a feature image with a superposition feature.

5. The method of claim 3, wherein the multi-scale fusion unit comprises a third convolution subunit, a fourth convolution subunit, an up-sampling subunit, and a second superposition subunit;
wherein the performing, through the multi-scale fusion unit, feature fusion on the feature image output by the residual convolution unit comprises:
convolving, through the third convolution subunit, a feature image with a larger scale in feature images output by the residual convolution unit;
convolving, through the fourth convolution subunit, a feature image with a smaller scale in the feature images output by the residual convolution unit;
up-sampling, through the up-sampling subunit, a feature image output by the fourth convolution subunit;
performing, through the second superimposing subunit, feature superimposition on a feature image output by the third convolution subunit and a feature image output by the up-sampling subunit, and outputting a feature image with a superposition feature.

6. The method of claim 3, wherein the chain residual pooling unit comprises a first pooling subunit, a fifth convolution subunit, a third BN subunit, a third superposition subunit, a second pooling subunit, a sixth convolution subunit, a fourth BN subunit, and a fourth superposition subunit;
wherein the performing, through the chain residual pooling unit, low-frequency feature extraction on the feature image output by the multi-scale fusion unit comprises:
performing, through the first pooling subunit, pooling processing on the feature image output by the multi-scale fusion unit;
convolving, through the fifth convolution subunit, a feature image output by the first pooling subunit;
performing, through the third BN subunit, regularization processing on a feature image output by the fifth convolution subunit;
performing, through the third superposition subunit, feature superposition on a feature image output by the multi-scale fusion unit and a feature image output by the third BN subunit;
performing, through the second pooling subunit, pooling processing on a feature image output by the third BN subunit;
convolving, through the sixth convolution subunit, a feature image output by the second pooling subunit;
performing, through the fourth BN subunit, regularization processing on a feature image output by the sixth convolution subunit;
performing, through the fourth superposition subunit, feature superimposition on a feature image output by the third superposition subunit and a feature image output by the fourth BN subunit, and outputting a feature image with a superposition feature.

7. The method of claim 1, wherein before the acquiring, by the image input layer, the original image, the method further comprises:
training the convolutional neural network by a random gradient descent method using a training image of a sky scene.

8. The method of claim 7, wherein a loss function Loss of the random gradient descent method is:

$$\text{Loss} = \frac{1}{H \times W} \sum_{i \in H, j \in W} (I'_{ij} - I_{ij})^2$$

wherein H is the total number of rows of pixels of the training image, W is the total number of columns of the pixels of the training image, i is a row number of a pixel of the training image, j is a column number of the pixel of the training image, $I_{ij}$ is a real result that a target pixel of which a row number is i and a column number is j belongs to the sky area, $I'_{ij}$ is an output result that the target pixel belongs to the sky area outputted by the iterative convolutional neural network.

9. A convolutional neural network processor for segmenting a sky area, comprising:
- an image input layer configured to acquire an original image;
- a first convolutional neural network configured to extract a plurality of sky feature images with different scales from the original image, wherein a scale of each sky feature image is smaller than a scale of the original image, the first convolutional neural network is a VGG-19 convolutional neural network;
- a plurality of cascaded second convolutional neural networks configured to process the plurality of sky feature images to output a target feature image, wherein a scale of the target feature image is the same as a maximum scale in the plurality of sky feature images;
- an up-sampling layer configured to up-sample the target feature image to obtain an up-sampled feature image of which a scale is the same as the scale of the original image; and
- a sky area determining layer configured to determine a pixel area of which a gray value is greater than or equal to a preset gray value in the up-sampled feature image as a sky area:
- wherein the plurality of sky feature images comprise a first sky feature image a second sky feature image, a third sky feature image, and a fourth sky feature image; a scale of the first sky feature image is ½ of a scale of the second sky feature image, the scale of the second sky feature image is ½ of a scale of the third sky feature image, the scale of the third sky feature image is ½ of a scale of the fourth sky feature image, the fourth sky feature image is an output image of a fourth convolution layer in the first convolutional neural network, the third sky feature image is an output image of an eighth convolution layer in the first convolutional neural network, the second sky feature image is an output image of a twelfth convolution layer in the first convolutional neural network, the first sky feature image is an output image of a sixteenth convolution layer in the first convolutional neural network, and the plurality of cascaded second convolutional neural networks comprises three levels of second convolutional neural networks;
- a first-level second convolutional neural network is to perform feature processing on the first sky feature image and the second sky feature image to obtain a first intermediate target feature image of which a scale is the same as the scale of the second sky feature image;
- a second-level second convolutional neural network is to perform the feature processing on the first intermediate target feature image and the third sky feature image to obtain a second intermediate target feature image of which a scale is the same as the scale of the third sky feature image; and
- a third-level second convolutional neural network is to perform the feature processing on the second intermediate target feature image and the fourth sky feature image to obtain the target feature image of which the scale is the same as the scale of the fourth sky feature image.

10. The convolutional neural network processor of claim 9, wherein the scale of the fourth sky feature image is ½ of the scale of the original image, the scale of the third sky feature image is ¼ of the scale of the original image, the scale of the second sky feature image is ⅛ of the scale of the original image, the scale of the first sky feature image is 1/16 of the scale of the original image.

11. The convolutional neural network processor of claim 9, wherein each of the plurality of cascaded second convolutional neural networks comprises:
- a residual convolution unit configured to perform global feature extraction on the input feature image;
- a multi-scale fusion unit configured to perform feature fusion on a feature image output by the residual convolution unit;
- a chain residual pooling unit configured to perform low-frequency feature extraction on a feature image output by the multi-scale fusion unit; and
- a convolution output unit configured to convolve a feature image output by the chain residual pooling unit to obtain an intermediate target feature image or the target feature image.

12. The convolutional neural network processor of claim 11, wherein the residual convolution unit comprises:
- a first activation function subunit configured to perform nonlinear processing on the input feature image;
- a first convolution subunit configured to convolve a feature image output by the first activation function subunit;
- a first batch normalization (BN) subunit configured to perform regularization processing on a feature image output by the first convolution subunit;
- a second activation function subunit configured to perform nonlinear processing on a feature image output by the first BM subunit;
- a second convolution subunit configured to convolve a feature image output by the second activation function subunit;
- a second BN subunit configured to perform regularization processing on a feature image output by the second convolution subunit; and
- a first superposition subunit configured to perform feature superposition on the feature image input into the first activation function subunit and a feature image output by the second BN subunit.

13. The convolutional neural network processor of claim 11, wherein the multi-scale fusion unit comprises:
- a third convolution subunit configured to convolve a feature image with a larger scale in feature images output by the residual convolution unit;
- a fourth convolution subunit configured to convolve a feature image with a smaller scale in the feature images output by the residual convolution unit;
- an up-sampling subunit configured to up-sample a feature image output by the fourth convolution subunit; and
- a second superposition subunit configured to perform feature superimposition on a feature image output by the third convolution subunit and a feature image output by the up-sampling subunit.

14. The convolutional neural network processor of claim 11, wherein the chain residual pooling unit comprises:
- a first pooling subunit configured to perform pooling processing on the feature image output by the multi-scale fusion unit;
- a fifth convolution subunit configured to convolve a feature image output by the first pooling subunit;
- a third BN subunit configured to perform regularization processing on a feature image output by the fifth convolution subunit;
- a third superposition subunit configured to perform feature superposition on a feature image output by the multi-scale fusion unit and a feature image output by the third BN subunit;

a second pooling subunit configured to perform pooling processing on a feature image output by the third BN subunit;

a sixth convolution subunit configured to convolve a feature image output by the second pooling subunit;

a fourth BN subunit configured to perform regularization processing on a feature image output by the sixth convolution subunit; and a fourth superposition subunit configured to perform feature superimposition on a feature image output by the third superposition subunit and a feature image output by the fourth BN subunit.

15. The convolutional neural network processor of claim 9, further comprising:

a network training layer configured to train the convolutional neural network by a random gradient descent method using a training image of a sky scene;

wherein a loss function Loss of the random gradient descent method is:

$$\text{Loss} = \frac{1}{H \times W} \sum_{i \in H, j \in W} (I'_{ij} - I_{ij})^2$$

wherein H is the total number of rows of pixels of the training image, W is the total number of columns of the pixels of the training image, i is a row number of a pixel of the training image, j is a column number of the pixel of the training image, $I_{ij}$ is a real result that a target pixel of which a row number is i and a column number is j belongs to the sky area, $I'_{ij}$ is an output result that the target pixel belongs to the sky area outputted by the iterative convolutional neural network.

16. An apparatus for segmenting a sky area based on a convolutional neural network, comprising:

a memory; and a processor, wherein the convolutional neural network comprises an image input layer, a first convolutional neural network, a plurality of cascaded second convolutional neural networks, an up-sampling layer, and a sky area determining layer, wherein the first convolutional neural network is a VGG-19 convolutional neural network;

the memory is configured to store a computer program executable on the processor, the computer program, when executed by the processor, causes the processor to perform the following operations of the convolutional neural network:

acquiring, by the image input layer, an original image;

extracting, by the first convolutional neural network, a plurality of sky feature images with different scales from the original image, wherein a scale of each sky feature image is smaller than a scale of the original image;

processing, by the plurality of cascaded second convolutional neural networks, the plurality of sky feature images to output a target feature image, wherein a scale of the target feature image is the same as a maximum scale in the plurality of sky feature images;

up-sampling, by the up-sampling layer, the target feature image to obtain an up-sampled feature image of which a scale is the same as the scale of the original image; and determining, by the sky area determining layer, a pixel area of which a gray value is greater than or equal to a preset gray value in the up-sampled feature image as a sky area;

wherein the plurality of sky feature images comprise a first sky feature image, a second sky feature image, a third sky feature image, and a fourth sky feature image; a scale of the first sky feature image is ½ of a scale of the second sky feature image, the scale of the second sky feature image is ½ of a scale of the third sky feature image, the scale of the third sky feature image is ½ of a scale of the fourth sky feature image, the fourth sky feature image is an output image of a fourth convolution layer in the first convolutional neural network, the third sky feature image is an output image of an eighth convolution layer in the first convolutional neural network, the second sky feature image is an output image twelfth convolution layer in the first convolutional neural network, the first sky feature image is an output image of a sixteenth convolution layer in the first convolutional neural network, and the plurality of cascaded second convolutional neural networks comprises three levels of second convolutional neural networks;

the computer program, when executed by the processor, further causes the processor to perform the following operations of the convolutional neural network:

performing, by a first-level second convolutional neural network, feature processing on the first sky feature image and the second sky feature image to obtain a first intermediate target feature image of which a scale is the same as the scale of the second sky feature image;

performing, by a second-level second convolutional neural network, the feature processing on the first intermediate target feature image and the third sky feature image to obtain a second intermediate target feature image of which a scale is the same as the scale of the third sky feature image; and performing, by a third-level second convolutional neural network, the feature processing on the second intermediate target feature image and the fourth sky feature image to obtain the target feature image of which the scale is the same as the scale of the fourth sky feature image.

* * * * *